US007431039B2

(12) United States Patent
Chu

(10) Patent No.: US 7,431,039 B2
(45) Date of Patent: Oct. 7, 2008

(54) CLEANING FACILITY FOR TUBING SYSTEM OF VEHICLE

(76) Inventor: Henry C. Chu, 133 N. Lemon St., Orange, CA (US) 92866

( * ) Notice: Subject to any disclaimer, the term of this patent is extended or adjusted under 35 U.S.C. 154(b) by 667 days.

(21) Appl. No.: 10/900,863

(22) Filed: Jul. 27, 2004

(65) Prior Publication Data

US 2006/0021640 A1 Feb. 2, 2006

(51) Int. Cl.
*B08B 9/032* (2006.01)
*B60S 3/00* (2006.01)

(52) U.S. Cl. ................. 134/111; 134/169 A; 210/195.1

(58) Field of Classification Search ............. 134/166 R, 134/169 C, 169 A, 169 R, 109–111; 210/194, 210/195.1, 167.01
See application file for complete search history.

(56) References Cited

U.S. PATENT DOCUMENTS 3,295,538 A * 1/1967 Williams, Jr. ............... 134/111
4,298,358 A * 11/1981 Ruschke ....................... 96/174
4,412,551 A * 11/1983 Peters et al. ............. 134/104.4
4,606,363 A * 8/1986 Scales ........................ 134/111

* cited by examiner

*Primary Examiner*—Terry K Cecil
(74) *Attorney, Agent, or Firm*—Charles E. Baxley

(57) ABSTRACT

A cleaning facility for cleaning tubing systems includes a reservoir having a chamber to receive flush fluid, a pipe coupling the reservoir to the tubing systems, to allow the flush fluid to flow from the reservoir into the tubing systems to flush the tubing systems. A tank includes a space to receive the flush fluid from the tubing systems, and to collect the flush fluid. A filter is coupled to the tank, to filter the flush fluid and to allow only gas to flow out of the tank. A conduit is coupled to the reservoir, to supply pressurized air to pump the flush fluid from the reservoir to the tubing systems to flush and to clean the tubing systems.

5 Claims, 3 Drawing Sheets

CLEANING FACILITY FOR TUBING SYSTEM OF VEHICLE

BACKGROUND OF THE INVENTION

1. Field of the Invention

The present invention relates to a cleaning facility, and more particularly to a cleaning facility for easily and quickly cleaning tubing systems of vehicles.

2. Description of the Prior Art

Vehicles, boats, or airplanes may include various kinds of tubing systems therein, such as lubrication tubing systems, air conditioning tubing systems, fuel supplying tubing systems, etc. which comprise a number of tubes or pipes that are required to be cleaned after a period of time of using.

Various kinds of typical cleaning facilities have been developed for cleaning the tubes or pipes or various systems of the vehicles, and comprise a fluid flowing system for filling fluid and detergent to clean the tubes or pipes or various systems of the vehicles.

After the cleaning operations, an air flowing system is then required to be provided to pump air or to supply pressurized air through the tubes or pipes or various systems of the vehicles, in order to blow and to clean and to force the fluid and the detergent through the tubes or pipes or various systems of the vehicles, and then into a container.

However, while conducting the cleaning operations, the pressurized air and the fluid and the detergent will all be forced into the container, such that the container may be easily over pressurized and may have a good chance to be exploded. These problems annoy the vehicle cleaning operators much.

In addition, the fluid flowing systems and the air flowing systems of the typical cleaning facilities both comprise a number of couplers that are required to be coupled to and disengaged from the tubes or pipes or various systems of the vehicles alternatively and frequently, such that a lot of labor works are required for coupling and disconnecting the fluid flowing systems and the air flowing systems of the typical cleaning facilities from the tubes or pipes or various systems of the vehicles, and such that the flushing and cleaning operations may not be done without experienced and specially trained persons or experts.

The present invention has arisen to mitigate and/or obviate the afore-described disadvantages of the conventional cleaning facilities for tubing systems of vehicles.

SUMMARY OF THE INVENTION

The primary objective of the present invention is to provide a cleaning facility including a simplified configuration for easily and quickly cleaning tubing systems of vehicles.

In accordance with one aspect of the invention, there is provided a cleaning facility for cleaning tubing systems, the cleaning facility comprising a reservoir including a chamber formed therein for receiving a flush fluid therein, a pipe including a first end engaged into the chamber of the reservoir, and a second end for coupling to the tubing systems, to allow the flush fluid to flow from the reservoir into the tubing systems to flush the tubing systems, a tank including a space formed therein for receiving the flush fluid from the tubing systems, and for collecting the flush fluid in the space of the tank, a filter including an entry coupled to the tank, to filter the flush fluid into filtered flush fluid, and to prevent the flush fluid from flowing out of the tank, and to allow only gas to flow out of the tank, and a conduit coupled to the reservoir, to supply pressurized air into the reservoir, and to pump the flush fluid to flow from the reservoir into the tubing systems to flush and to clean the tubing systems.

The tank includes a duct extended therefrom and engaged into the reservoir, to allow the filtered flush fluid to flow into the reservoir. The tank is preferably disposed above the reservoir and includes a lower portion having the duct extended downwardly therefrom and engaged into the reservoir. The tank includes a control valve attached to the duct, to control a flowing of the filtered flush fluid from the tank to the reservoir.

The reservoir includes a lower portion, the first end of the pipe is engaged into the lower portion of the reservoir. The reservoir includes an upper portion, the conduit includes an exit engaged into the upper portion of the reservoir, to supply the pressurized air into the upper portion of the reservoir.

The conduit includes an air pressure regulator attached thereto, to control a pressure of the pressurized air supplying into the reservoir. The conduit includes a control valve attached thereto, to control a flowing of the pressurized air supplying into the reservoir.

The tank includes a second filter disposed thereon and having an opening for coupling to the tubing systems and for receiving and filtering the flush fluid, and having a port engaged into the tank, to allow filtered flush fluid to flow into the tank.

The tank includes a baffler disposed therein, to receive and to dissipate the filtered flush fluid from the second filter. The baffler includes a link secured to the port of the filter.

The tank includes a divider disposed therein, and disposed between the port of the second filter and the entry of the filter, to separate the port of the second filter and the entry of the filter from each other.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
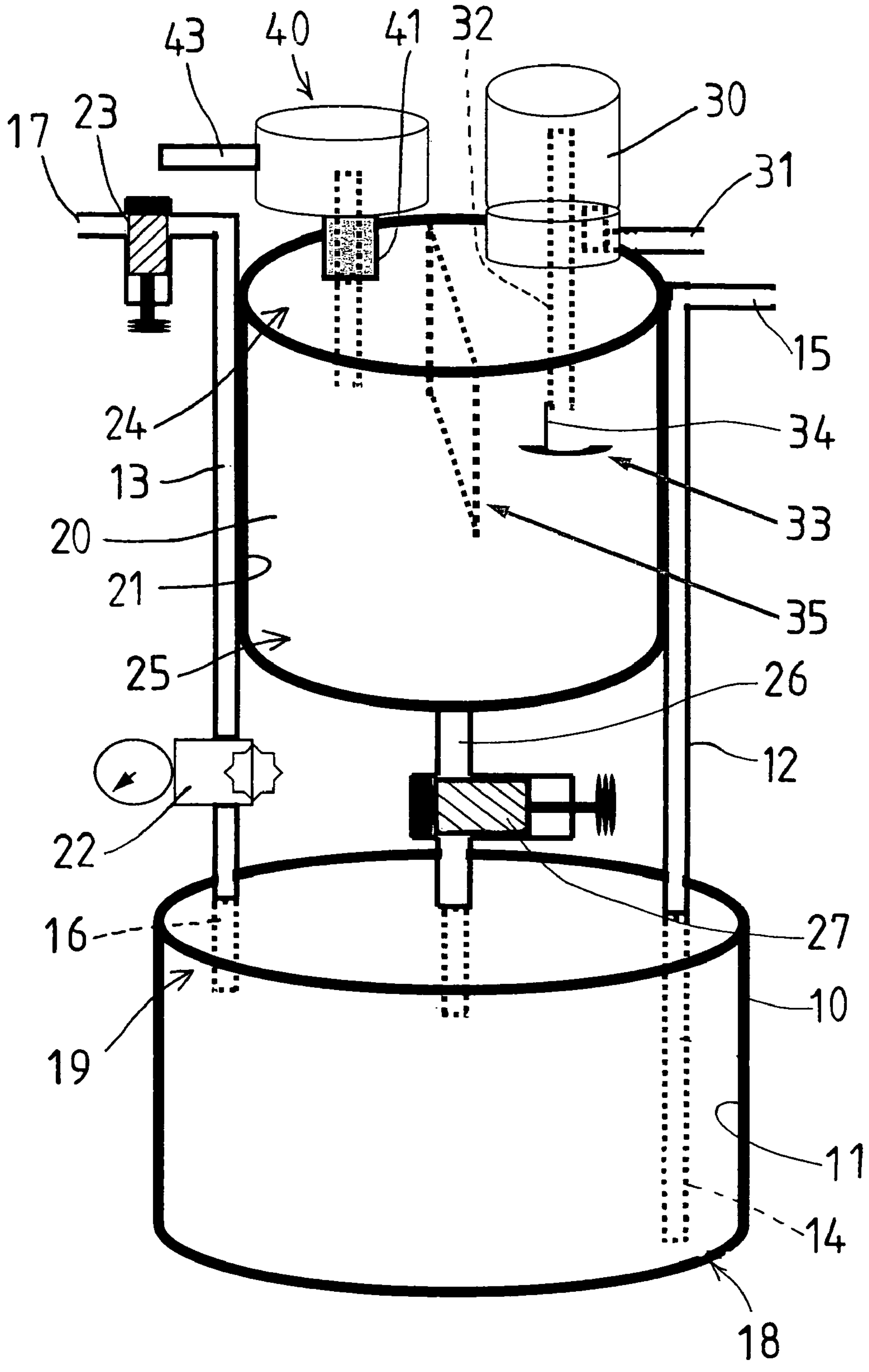
FIG. 1 is a perspective view of a cleaning facility in accordance with the present invention.

Referring to the drawings, and initially to FIG. 1, a cleaning facility in accordance with the present invention comprises a fluid reservoir 10 including a chamber 11 formed therein for receiving flush fluid and/or detergent therein, and a fluid tank 20 including a space 21 formed therein for receiving flush fluid and/or detergent and/or air or gas therein.

It is preferable that the fluid tank 20 is disposed above the fluid reservoir 10, and may be supported or retained above the fluid reservoir 10 with a pipe 12 and/or a conduit 13, or other posts or rods or the like. For example, the fluid tank 20 may be attached or secured to the pipe 12 directly with such as fasteners (not shown), or by welding processes, for allowing the fluid tank 20 to be secured to and supported above the fluid reservoir 10.

Figure 2:
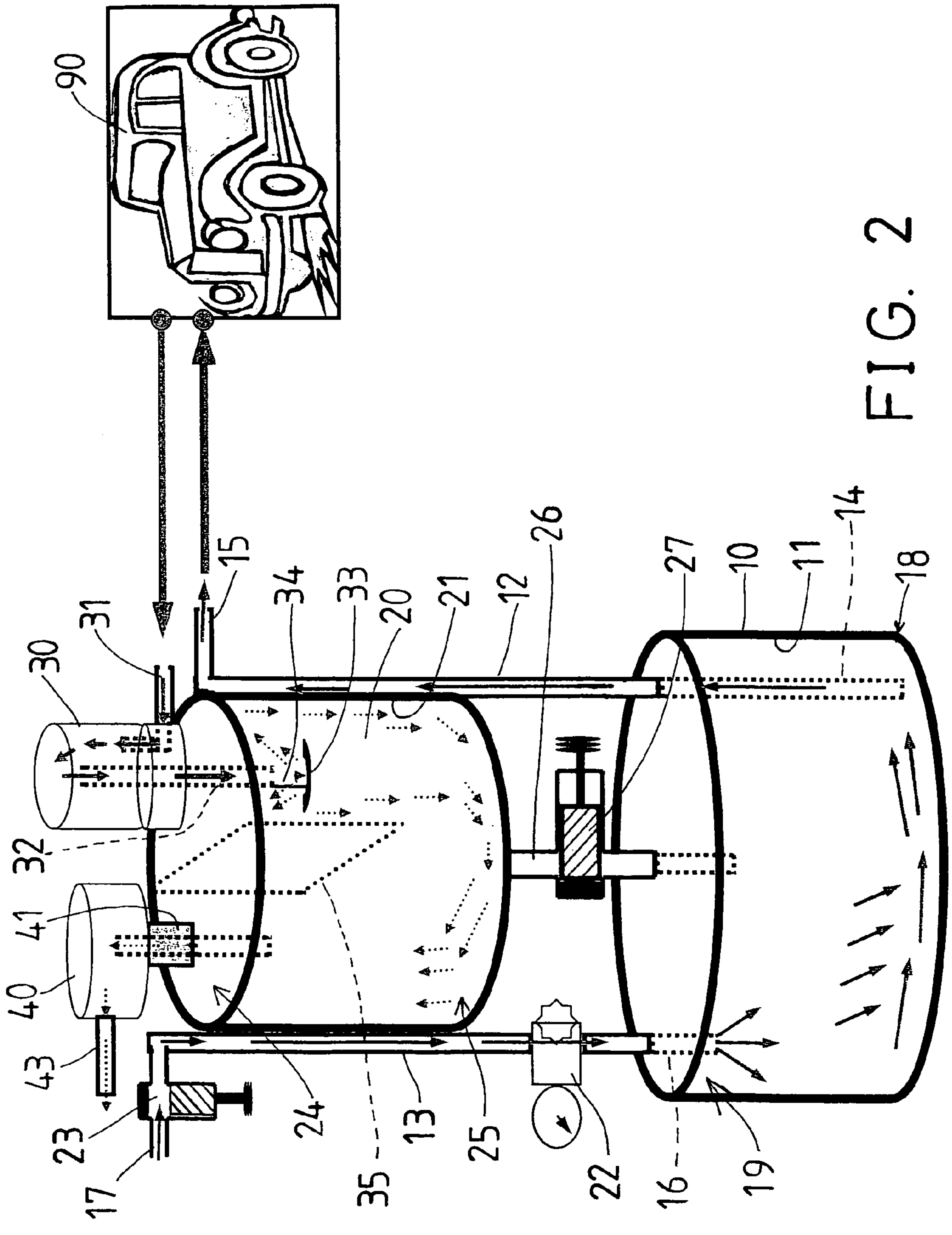
FIG. 2 is a perspective view similar to FIG. 1, illustrating the flushing and air purging operation of the cleaning facility.
Figure 3:
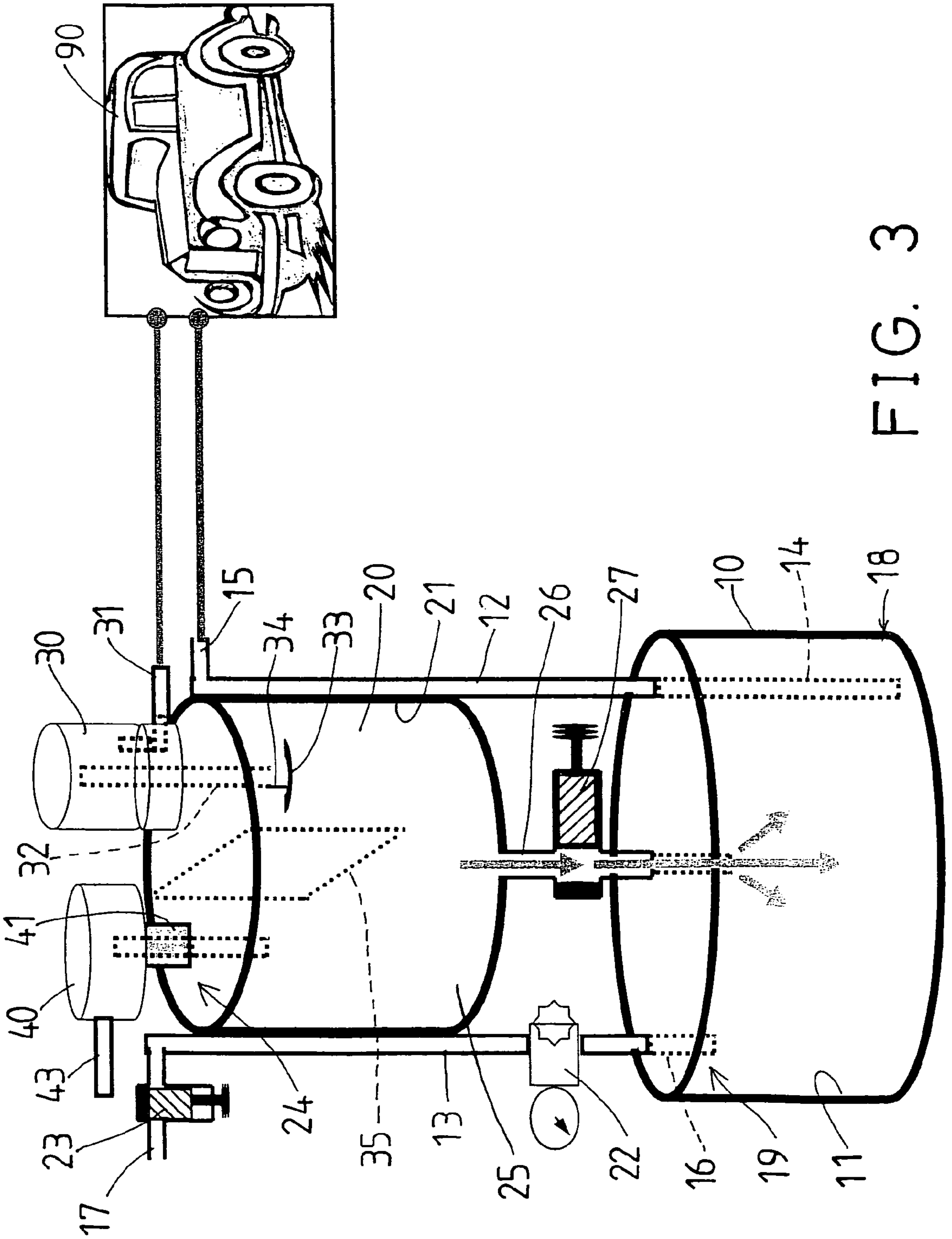
FIG. 3 is a perspective view similar to FIGS. 1 and 2, illustrating the fluid draining operation of the cleaning facility.

The pipe 12 includes a lower end or an inlet 14 engaged into the chamber 11 of the fluid reservoir 10, and an upper end or an outlet 15 for coupling to various tubing systems 90 of boats or airplanes or vehicles, such as lubrication tubing systems, fuel supplying tubing systems, or air conditioning tubing systems, etc., for allowing the flush fluid and/or detergent contained within the fluid reservoir 10 to flow into the tubing systems 90 (FIGS. 2, 3).

The conduit 13 may also be attached or secured to or between the fluid tank 20 and the fluid reservoir 10 with such as fasteners (not shown), or by welding processes, for further stably secure and attach and support the fluid tank 20 above the fluid reservoir 10. The conduit 13 may includes a lower end or an exit 16 engaged into the chamber 11 of the fluid reservoir 10, and an upper end or an entrance 17 for coupling to air reservoirs, for allowing pressurized air or gas to be supplied into the chamber 11 of the fluid reservoir 10, in order to force or to blow or to pump the flush fluid and/or detergent from the fluid reservoir 10 to the tubing systems 90.

It is preferable that the lower end or inlet 14 of the pipe 12 is engaged into the lower or bottom portion 18 of the chamber 11 or of the fluid reservoir 10, to allow the flush fluid and/or detergent to be first blown or pumped from the fluid reservoir 10 to the tubing systems 90. The lower end or exit 16 of the conduit 13 is preferably engaged into the upper portion 19 of the chamber 11 or of the fluid reservoir 10, to allow the pressurized air to suitably blow or pump or force the flush fluid and/or detergent from the fluid reservoir 10 to the tubing systems 90.

An air pressure regulator 22 may further be provided and attached to the conduit 13, in order to control the pressure of the pressurized air or gas supplied or flowing from the air reservoirs into the chamber 11 of the fluid reservoir 10, to allow the flush fluid and/or detergent to be suitably forced or pressurized or blown into the tubing systems 90 from the fluid reservoir 10. A control valve 23 may further be provided and attached to the conduit 13, in order to control the supplying or flowing of the pressurized air or gas from the air reservoirs into the chamber 11 of the fluid reservoir 10.

A flush fluid filter 30 may further be provided and attached or disposed on the upper portion 24 of the fluid tank 20, for example, and may include an opening 31 for coupling to the tubing systems 90 of the vehicles, and for filtering particles or contaminants from the flush fluid, and may include a port 32 engaged or opened into the upper portion 24 of the fluid tank 20, for allowing the filtered flush fluid to flow into the fluid tank 20, particularly to flow into the lower portion 25 of the fluid tank 20.

A duct 26 may be attached to or provided on or extended from the lower portion 25 of the fluid tank 20, and engaged into the fluid reservoir 10, and preferably engaged into the upper portion 19 of the chamber 11 or of the fluid reservoir 10, to allow the filtered flush fluid and/or detergent to flow into the fluid reservoir 10 (FIG. 3). A control valve 27 may further be provided and attached to the duct 26, in order to control the flowing of the filtered flush fluid and/or detergent from the fluid tank 20 into the chamber 11 of the fluid reservoir 10.

It is to be noted that, while conducting a flushing operation, the pressurized air or gas and the flush fluid and/or detergent may be blow into the fluid tank 20 in great speeds, such that the flush fluid and/or detergent may disperse or spatter everywhere. Accordingly, it is preferable that a baffler 33 is disposed below the port 32 of the filter 30, such as secured to the port 32 of the filter 30 with a link 34, to receive and to dissipate the pressurized flush fluid and/or detergent (FIG. 2), and to prevent the pressurized flush fluid and/or detergent from directly forcing or thrusting onto the filtered flush fluid collected in the lower portion 25 of the fluid tank 20.

An air vent or filter 40 may further be provided and attached to the upper portion 24 of the fluid tank 20, and may include an entry 41 coupled to or engaged into the fluid tank 20, to receive the mist air or gas or fluid (FIG. 2), and to filter the flush fluid and/or detergent, and to prevent the flush fluid and/or detergent from flowing out of the fluid tank 20. The filter 40 includes a vent 43 for allowing the filtered air or gas to flow out through the filter 40 (FIG. 2).

It is preferable that a divider 35 is further provided and attached to the upper portion 24 of the fluid tank 20, and disposed between the port 32 of the filter 30 and the entry 41 of the filter 40, to separate the port 32 of the filter 30 and the entry 41 of the filter 40 from each other, and to prevent the pressurized flush fluid and/or detergent or the mist air or gas or fluid from directly flowing from the port 32 of the filter 30 to the entry 41 of the filter 40, and to facilitate the collection of the flush fluid and/or detergent in the lower portion 25 of the fluid tank 20.

In operation, as shown in FIG. 2, the pressurized air or gas may be controlled and selectively supplied into the upper portion 19 of the chamber 11 or of the fluid reservoir 10 via the lower end or exit 16 of the conduit 13, in order to blow or pump the flush fluid and/or detergent from the fluid reservoir 10 into the tubing systems 90 of the vehicles, and thus to clean the tubing systems 90.

The blown or pumped or pressurized flush fluid and/or detergent may then flow into the fluid tank 20 and filtered by the filter 30, and may then be forced to flow through the other filter 40, to allow only the air or the gas to flow out through the filter 40, and to allow the filtered flush fluid and/or detergent to be collected within the fluid tank 20.

Accordingly, while conducting the cleaning operations, it is only required to continuously supply the pressurized air or gas into the fluid reservoir 10, and the flush fluid and/or detergent may then be continuously blown or pumped through the tubing systems 90 of the vehicles, such that the tubing systems 90 may be automatically flushed and cleaned without much labor works.

After the cleaning or flushing operations, the filtered flush fluid and/or detergent may be controlled to selectively flow downwardly into the fluid reservoir 10 by the control valve 27. It is preferable, but not necessarily, that the fluid tank 20 be disposed above the fluid reservoir 10, to allow the filtered flush fluid and/or detergent to be easily controlled and flown downwardly into the fluid reservoir 10 by the control valve 27.

Accordingly, the cleaning facility in accordance with the present invention includes a simplified configuration for easily and quickly cleaning tubing systems of vehicles.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A cleaning facility for cleaning tubing systems, said cleaning facility comprising:

a reservoir including a chamber formed therein for receiving a flush fluid therein, a pipe including a first end engaged into said chamber of said reservoir, and a second end for coupling to the tubing systems, to allow the flush fluid to flow from said reservoir into the tubing systems to flush the tubing systems, a tank disposed above said reservoir and including a space formed therein for receiving the flush fluid from the tubing systems, and for collecting the flush fluid in said space of said tank, and including a lower portion having a duct extended downwardly therefrom and engaged into said reservoir to allow the flush fluid to flow into said reservoir, a first control valve attached to said duct to control a flowing of the flush fluid from said tank to said reservoir, a first filter disposed on said tank and including an opening for coupling to the tubing systems and for receiving and filtering the flush fluid into a filtered flush fluid, and including a port engaged into said tank to allow the filtered flush fluid to flow into said tank, a baffler disposed in said tank to receive and to dissipate the filtered flush fluid from said first filter, a second filter including an entry coupled to said tank, to filter the flush fluid and to prevent the flush fluid from flowing out of said tank, and to allow only gas to flow out of said tank, a conduit spaced from said duct and including an exit engaged into said reservoir, to supply pressurized air into said reservoir, and to pump the flush fluid to flow from said reservoir into the tubing systems to flush and to clean the tubing systems, each of said pipe and said conduit being attached to said tank for supporting said tank spacingly above said reservoir, an air pressure regulator attached to said conduit to control a pressure of the pressurized air supplying into said reservoir, and a control valve attached to said conduit to control a flowing of the pressurized air supplying into said reservoir.

2. The cleaning facility as claimed in claim 1, wherein said reservoir includes a lower portion, said first end of said pipe is engaged into said lower portion of said reservoir.

3. The cleaning facility as claimed in claim 1, wherein said reservoir includes an upper portion, said exit of said conduit is engaged into said upper portion of said reservoir, to supply the pressurized air into said upper portion of said reservoir.

4. The cleaning facility as claimed in claim 1, wherein said baffler includes a link secured to said port of said filter.

5. The cleaning facility as claimed in claim 1, wherein said tank includes a divider disposed therein, and disposed between said port of said first filter and said entry of said second filter, to separate said port of said first filter and said entry of said second filter from each other.

* * * * *